United States Patent [19]

Manton

[11] Patent Number: 4,567,717

[45] Date of Patent: Feb. 4, 1986

[54] FORAGE HARVESTER ROW CROP ATTACHMENT

[75] Inventor: Timothy J. Manton, Lititz, Pa.

[73] Assignee: Sperry Corporation, New Holland, Pa.

[21] Appl. No.: 647,592

[22] Filed: Sep. 6, 1984

[51] Int. Cl.[4] .............................................. A01D 45/00
[52] U.S. Cl. ........................................... 56/119; 56/98
[58] Field of Search ..................................... 56/98, 119

[56] References Cited

U.S. PATENT DOCUMENTS

| | | | |
|---|---|---|---|
| 3,375,646 | 4/1968 | Dion | 56/98 |
| 3,400,524 | 9/1968 | Segredo | 56/98 |
| 3,654,752 | 4/1972 | Segredo | 56/98 |
| 3,796,029 | 3/1974 | Weigand et al. | 56/119 |
| 3,803,820 | 4/1974 | Knapp | 56/98 |
| 3,818,685 | 6/1974 | Stoessel et al. | 56/98 |
| 4,083,167 | 4/1978 | Lindblom et al. | 56/98 |
| 4,215,527 | 8/1980 | Shriver et al. | 56/98 |
| 4,249,366 | 2/1981 | Dolberg et al. | 56/119 |
| 4,300,335 | 11/1981 | Anderson | 56/119 |
| 4,496,682 | 5/1984 | Jennen et al. | 56/98 |

Primary Examiner—Paul J. Hirsch
Attorney, Agent, or Firm—Frank A. Seemar; Larry W. Miller; Darrell F. Marquette

[57] ABSTRACT

A multi-row forage harvester row crop header attachment having a rearwardly disposed transversely extending consolidating auger section and a plurality of fore-and-aft crop dividers projecting forwardly from the auger section. The crop dividers define passageways for accommodating rows of crop material. Crop severing means are disposed along each passageway for cutting the crop that is guided rearwardly during operation. Gathering and feeding mechanisms disposed along the passageways engage the severed crop material and feed it rearwardly to the auger section. The auger section includes a rear wall having an outlet for discharging crop that is conveyed laterally via the auger. Crop material being guided to the auger via the outward passageways is fed from the outlet of the passageway to the auger in a path that avoids a collision and thereby obviates bunching with crop material being fed from the next adjacent inward passageway.

5 Claims, 6 Drawing Figures

FORAGE HARVESTER ROW CROP ATTACHMENT

BACKGROUND OF THE INVENTION

The present invention relates generally to a row crop header attachment for a forage harvester and, more particularly, is directed to an improved multi-row crop header which promotes even feeding of crop material from adjacent stalkways to the transverse auger.

A typical forage harvester operating in row crops, such as corn or the like, includes a mobile base unit and a row crop header attached to the base unit for gathering crop from the field and feeding it rearwardly to the base unit. The base unit includes a forward generally rectangular inlet opening, a feed assembly spanning the width of the inlet opening and a cutter mechanism for cutting or chopping the stalks into small pieces. The row crop header attachment has a rear, generally centrally located discharge outlet in communication with the inlet opening when the header is mounted on the front of the base unit. As is well known, the crop is gathered by the header and delivered rearwardly through the central discharge outlet to the inlet opening and then into the feed roll assembly that feeds the crop to the cutterhead.

During recent years, the size of forage harvesters has become increasingly larger; however, even though the width of headers has been increased to accommodate larger machines the width of the cutterheads and thus the width of the feed roll assemblies and the associated inlet opening have remained relatively constant. To maintain maximum efficiency with these larger capacity machines there exists a direct relationship between the width of the cutterhead, the horsepower of the machine and the thickness and evenness of the mat of material being fed to the cutterhead. It is well recognized that the best results are achieved when the crop, such as corn, is fed to the feed roll assembly butt end first and in an even non-bunched manner. This enhances the length of cut quality and improves the overall efficiency of the forage harvester.

The butt end orientation of crop material being fed to the cutterhead from multi-row crop attachments has been provided for in various multi-row crop header attachments in the prior art. For example, U.S. Pat. No. 4,083,167, Lindblom et al, issued Apr. 11, 1978, and assigned to a common assignee, discloses an attachment in which a consolidating auger laterally conveys crop material in a butt end orientation to a narrow central discharge outlet and obviates askew feeding of the stalks to the cutterhead. In multi-row header attachments of this nature, it is important that the stalks being fed into the auger from the outside row units move transversely to the discharge outlet and merge smoothly with those stalks being fed into the auger from inwardly disposed row units. In heavy crop conditions, the stalks tend to bunch up when they merge resulting in uneven feeding to the cutterhead which in turn results in poor length of cut quality by the harvester base unit. This prevents optimization of machine performance.

SUMMARY OF THE INVENTION

The present invention provides an improved multi-row forage harvester row crop header attachment that facilitates even, non-bunched butt end feeding of stalk crops in a generally fore-and-aft orientation to the base unit and thereby enhances machine performance.

More specifically, a multi-row crop header attachment is contemplated of the type having a central rear outlet and a transversely extending auger for conveying crop material laterally to the central outlet and including a guide element disposed forwardly of the auger and between outer and inner adjacent crop passageways to prevent collision between crop material being fed from the passageways to the auger.

In one embodiment, the present invention comprises a multi-row forage harvester row crop header attachment having a supporting frame assembly and wall elements mounted on the frame assembly including a rear outlet therein. A plurality of dividers are mounted on the frame extending forwardly to define side-by-side crop passageways spaced at intervals corresponding to conventional spacing between rows of crops in the field. Crop cutter mechanisms are mounted adjacent each passageway to sever the stalks of crop material under conditions where the header is being propelled across the field in conjunction with a self-propelled base unit or a unit being pulled by a tractor. Gathering and feeding mechanisms are disposed in the passageways for engaging crop material and feeding severed material rearwardly to a transversely extending auger that receives crop material via the passageways and conveys it laterally to the discharge outlet. Unique guide elements are disposed forwardly of the auger and between outer and inner passageways to prevent collision between the crop material being fed from the passageways to the auger.

An important object of the invention is to provide guide elements that guide the stalks of crop material being fed from the outer crop passageway into engagement with the transverse auger at a level above the stalks of the crop material being fed from the next innermost passageway thereby enabling the auger to laterally convey the stalks from the adjacent stalkways at different heights. This is accomplished by means of a ramp affixed along the path of the stalks of the crop material being fed from the outermost passageway.

The foregoing and other objects, features and advantages of the invention will appear more fully hereinafter from a consideration of the detailed description which follows, in conjunction with the accompanying sheets of drawings wherein the principal embodiment of the invention is illustrated by way of example. It is to be expressly understood, however, that the drawings are for illustrative purposes and are not to be construed as defining the limits of the invention.

DETAILED DESCRIPTION OF THE PREFERRED EMBODIMENT

In the following description, right-hand and left-hand references are determined by standing at the rear of the attachment facing in a direction of forward travel of the machine to which it is attached. Also, in the following description, it is to be understood that such terms as "forward", "rearward", "left", "upwardly", "outwardly", etc. are words of convenience and are not to be construed as limiting terms.

Figure 1:
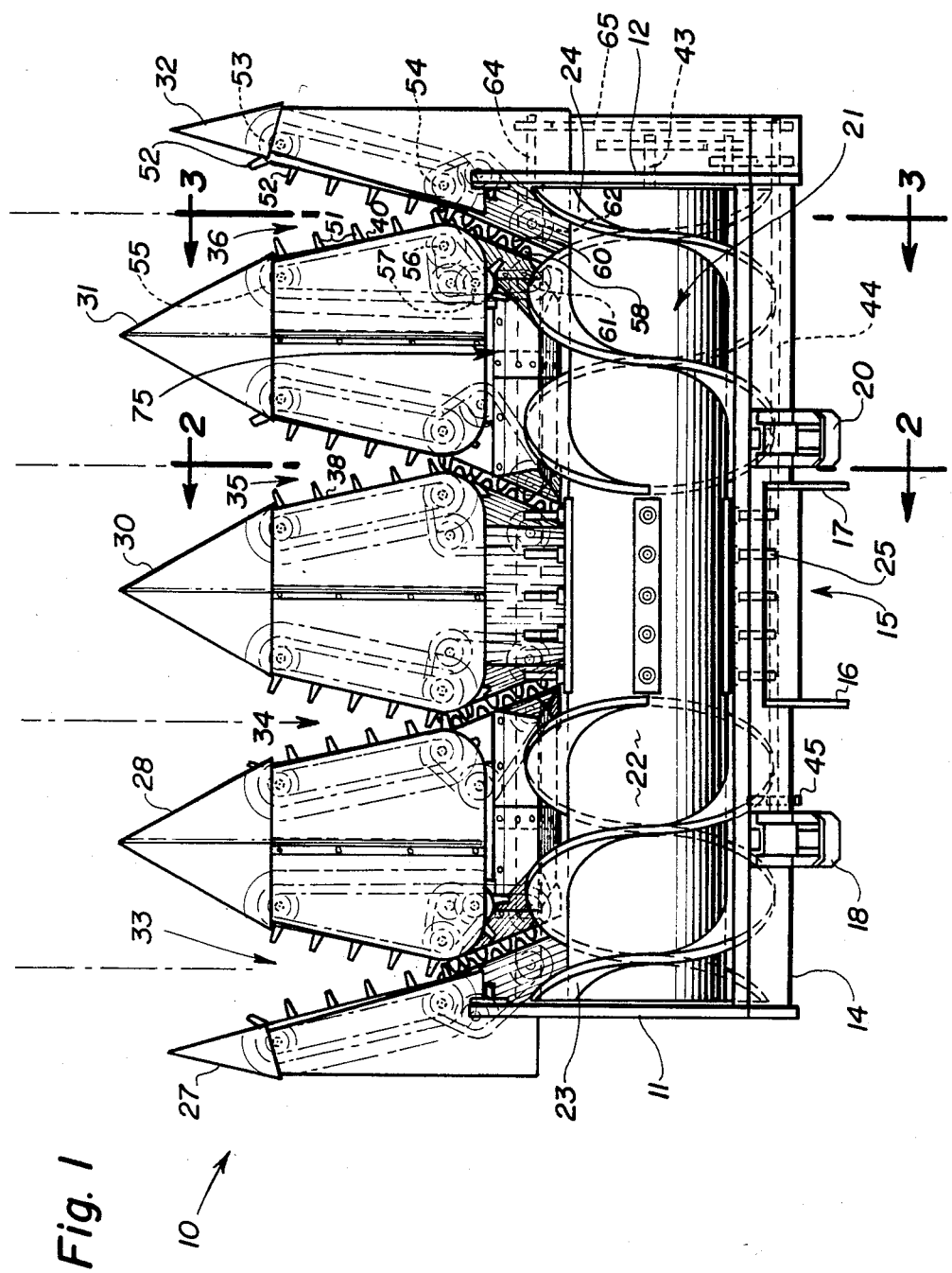
FIG. 1 is a plan view of a four row forage harvester row crop header attachment embodying the present invention.

Now referring to the drawings and, more particularly, to FIG. 1, there is shown a multi-row forage harvester row crop header attachment, generally designated by reference numeral 10, incorporating the principles of the present invention and adapted to be mounted on the front of a forage harvester unit. The forage harvester may be a pull-type or self-propelled unit for gathering rows of standing crop material, such as corn or the like, as the unit advances over a field on which stalk-type crops are planted in rows. The present invention is specifically designed to facilitate smooth butt end feeding of stalks to the main harvester unit. It is not specifically limited to the four-row header unit, shown in FIG. 1, but is adaptable to any multi-row forage harvester row crop header attachment in which a consolidating auger is utilized to convey material being fed rearwardly through crop passageways.

As shown in FIG. 1, the header 10 includes a general supporting frame having left and right sidewalls 11,12, respectively, a bottom wall 13 (see FIGS. 2 and 3) and a rear wall 14 with a centrally located discharge outlet 15. On opposite sides of the discharge outlet 15 are throat plates 16,17 each projecting outwardly and rearwardly from rear wall 14. The rear wall 14 also supports a pair of conventional mounting brackets 18,20 for attaching header 10 to the front of a harvesting unit. Mounting brackets 18,20 are positioned with respect to discharge outlet 15 such that when header 10 is mounted on the front of a forage harvesting base unit, discharge outlet 15 is in communication with the infeed opening to the feed rolls and cutterhead assembly of a conventional forage harvester processor (not shown).

Transversely extending between sidewalls 11,12 is an auger 21, comprising an auger tube 22 to which are affixed left and right flighting sections 23,24. Flighting sections 23,24 are spirally wrapped in pairs in opposite directions around auger tube 22 so as to laterally convey crop material along the auger in an inward direction to consolidate crop material at the central region of the auger adjacent discharge outlet 15. At the central region of auger 21 are provided spaced sets of side-by-side feed fingers 25 projecting in a generally radial direction to assist in urging consolidating material rearwardly through discharge outlet 15.

Figure 2:
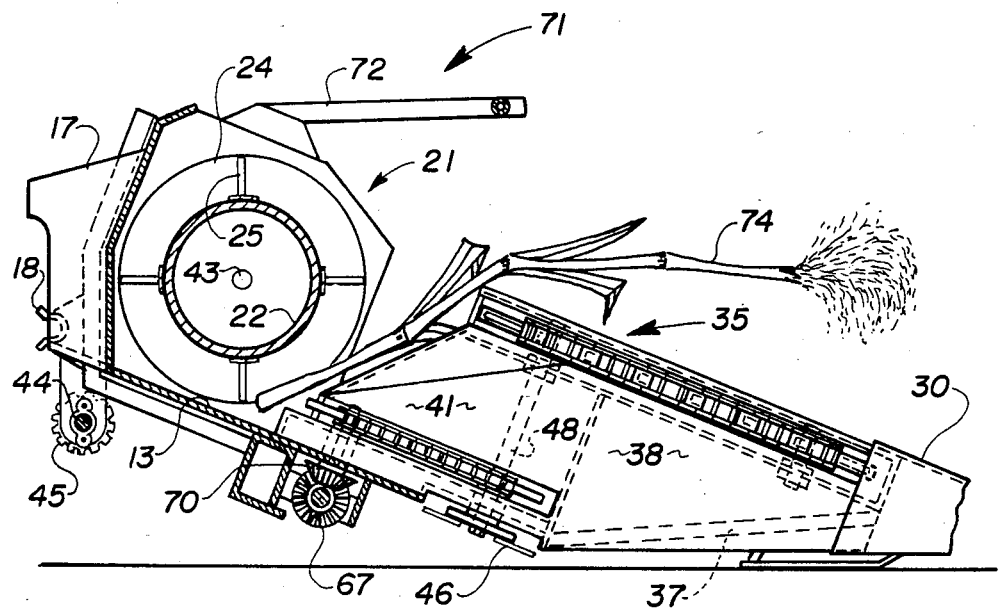
FIG. 2 is a vertical section along line 2—2 of FIG. 1 showing a standard divider element.
Figure 3:
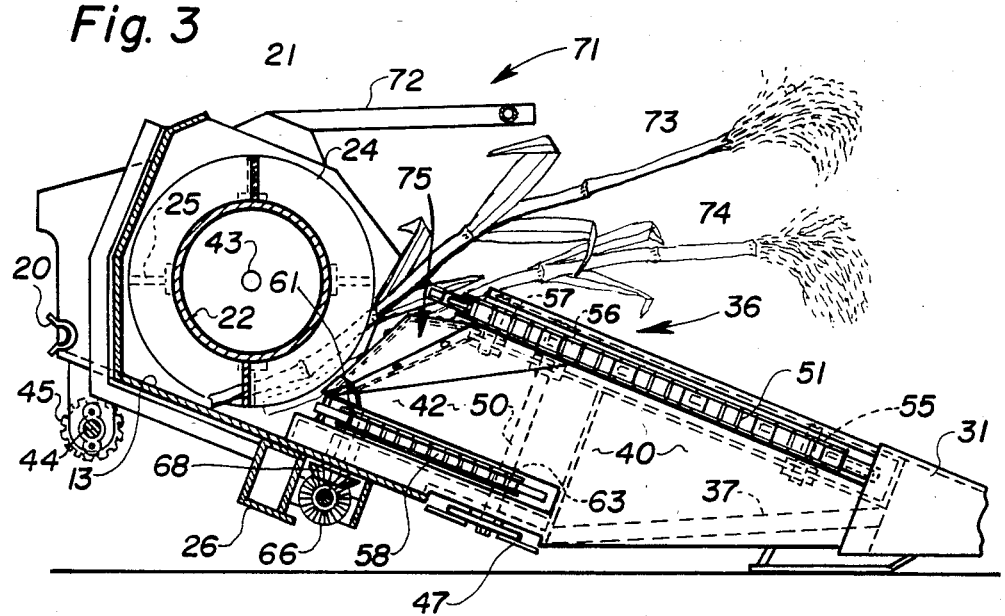
FIG. 3 is a vertical section along line 3—3 of FIG. 1 showing a divider with which the crop guide of the present invention is associated.

Extending between the lower front corners of sidewalls 11,12 and adjacent the front edge of bottom wall 13 is a transversely extending tubular frame member 26. The frame member supports a plurality of spaced apart fore-and-aft extending crop dividers 27,28,30,31,32. The dividers define crop passageways 33,34,35,36 for receiving the stalks of row crop material as the unit is advanced over a field. The dividers are fabricated from sheet metal material and are supported on various frame members, one of which 37 is shown in FIGS. 2 and 3. Each crop passageway comprises a pair of opposing forward wall portions 38,40 and a rearwardly disposed pair of opposing rearward wall portions 41,42 (see FIGS. 2 and 3). The crop passageway for purposes of this disclosure will be referred to as having forward and rearward portions defined by such forward and rearward wall portions.

Auger 21 is driven in a clockwise direction as viewed in FIGS. 2 and 3, by an auger drive that includes a sprocket 45 mounted on auger shaft 43 driven through a drive train via drive shaft 44 which is rotatably mounted and transversely extends below the lower rear corner formed by the bottom wall 13 and rear wall 14. The left end of drive shaft 44 terminates adjacent the inboard side of left mounting bracket 18 and supports the driven sprocket 45 which is connected to a drive chain (not shown) which in turn cooperates with a drive sprocket (not shown) on the mobile harvesting unit to which header 10 is adapted.

Referring now to FIGS. 1-3 to describe the various crop gathering components illustrated in association with header 10 for facilitating butt end feeding of crop stalks to auger 21 in a manner which promotes proper orientation of the stalks in a fore-and-aft position as the butt ends are first conveyed rearwardly toward auger 21 and then transversely in the direction of discharge outlet 15.

Crop passageways 35,36 on the right side of the attachment shown in FIG. 1 of header 10 are identical to passageways 33,34 on the left side. For the purposes of this description, only the components associated with crop passageway 36 will be explained in detail.

Disposed along each of the crop passageways are crop cutting means for severing the crop. Rotatable severing elements 46,47 (FIGS. 2,3) are supported on the lower ends of vertical shafts 48,50. Each of the drive shafts for the cutting means is journalled in upper and lower bearing means mounted on appropriate divider frame members.

The forward portion of crop passageway 36 is provided with a pair of upper gathering chains 51,52 which are disposed in crop dividers 31,32, respectively. The outboard chain 52 is entrained around a front upper sprocket 53 and a rear upper sprocket 54 whereas the inboard chain 51 is entrained around corresponding front upper and rear upper sprockets 55 and 56,57 respectively. Gathering chains 51 and 52 comprise standard lug elements projecting outwardly into the passageway to cooperatively engage the upper portions of stalks and thereby gather crop material and urge it rearwardly along the passageway to crop cutting means 47 whereupon the butt ends of the stalks are severed from the ground.

Crop dividers 31,32 further define a rear portion of crop passageway 36 which is a continuation of the forward portion. The rear crop passageway portion extends from the general area of upper rear sprockets 54,56 and terminates in the vicinity of the front edge of the auger, i.e., the outlet of the crop passageway. The rear portion of the passageway is angularly disposed from front to rear and in an inward direction toward the center of header 10 such that crop stalks passing therethrough are guided in the general direction of discharge outlet 15.

Disposed within the rear passageway portion is a pair of lower butt end gripping chains 58,60 which cooperate together to grip the butt ends of the stalks after they have been severed by cutting means 47. The butt end gripping chains convey stalks rearwardly along the passageway to the auger 21. Gripping chains 58,60 are entrained about cooperating rear lower sprockets 61,62 and front lower sprockets 63, (FIG. 3) respectively. The outboard lower front sprockets are supported on shaft 50,48 upon which is also mounted for rotation crop cutting means 46,47. The rear outboard sprocket is supported on a shaft journalled in an appropriate manner for rotation in response to drive means discussed below.

As the lower butt gripping chains 58,60 grip the butt ends of severed stalks and move then rearwardly along the angled inward rear portion of the passageway toward the auger, the upper portion of the stalks are also directed inwardly toward the center of the header by the rear portion of the gathering chains which tends to orient the severed stalks in a fore-and-aft position with the butt ends being directed rearwardly.

Drive means for the upper gathering chains, the lower butt gripping chains and the crop severing means is provided by a transverse shaft 64 which is driven by a drive chain 65 mounted on the right side of the header attachment. Drive chain 65 entrained about a sprocket on the main drive shaft 44 transverse shaft which in turn rotates transverse bevel gears 66,67 engaging with horizontal bevel gears 68,70 affixed to the shafts of lower rear sprockets 61 (only one designated). Transverse shaft 64 supports the plurality of spaced apart bevel gears, one of which is provided for each of the row units, only two of which are shown (FIGS. 2,3). The bevel gears are driveably engaged with a corresponding number of horizontal bevel gears supported on the lower ends of a similar shaft for each of the drives for the lower rear sprockets through which the respective upper gathering chains and crop cutting means are operatively associated. Thus, when driven sprocket 45 drives drive shaft 44 upper gathering chains 51,52 and butt end gripping chains 61,62 move rearwardly along the front and rear portions of the crop passageway 36 to gather and convey crop material in the manner described above.

To further promote butt end feeding, header 10 is provided with a stalk guide 71, comprising opposing forwardly extending brackets 72 (see FIGS. 2 and 3), between which a transverse shaft extends for directing the remote upper portions of the stalks downwardly to assist in the butt end feeding orientation of the crop material.

Figure 5:
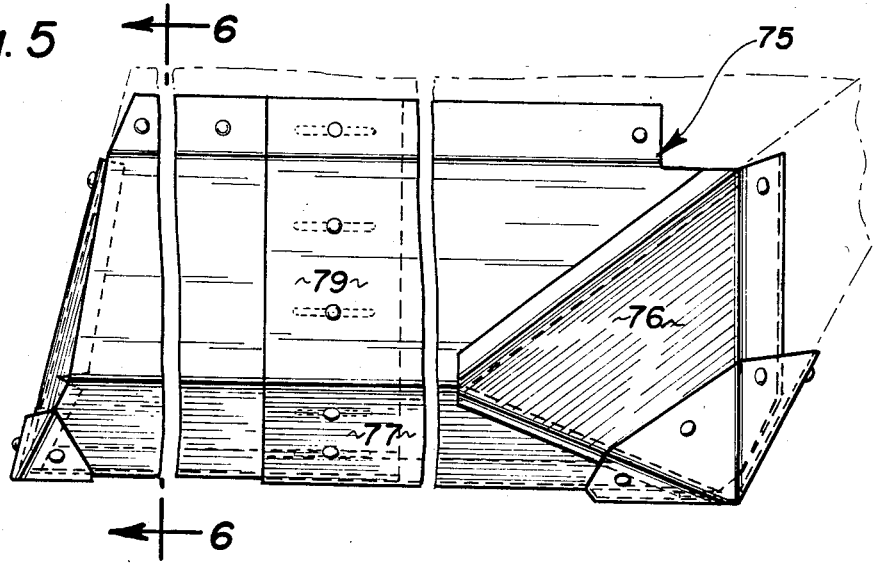
FIG. 5 is a fragmentary detail assembly view of the unique crop guide.
Figure 6:
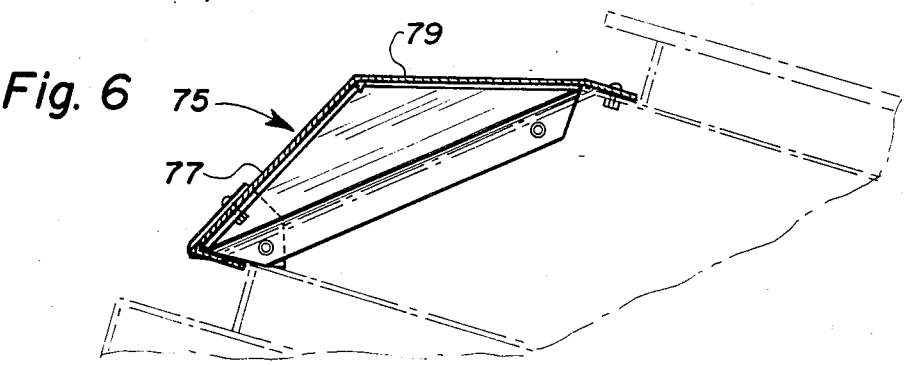
FIG. 6 is a detailed sectional view along line 6—6 of FIG. 5.

As shown in FIGS. 2 and 3, severed corn stalks are fed rearwardly in a butt end first orientation. Exemplary severed stalks are shown in FIGS. 2 and 3 in a generally horizontal position. A stalk, designated by reference numeral 73, is shown being fed from the outermost crop passageway 36 and a stalk, designated by reference numeral 74, is shown being conveyed rearwardly via the next innermost crop passageway 35. Disposed between passageways 35 and 36 and forward of auger 21 is crop lifter assembly 75, generally referred to as guide means throughout the following description. Now referring to FIGS. 5 and 6, assembly 75 includes a first inclined surface 76, a second upper planar surface 79 and a third lower planar surface 77. Upper and lower planar surfaces 79,77 are disposed generally parallel to the shaft of auger 21. Inclined surface 76 is inclined upwardly and rearwardly and provides a slanted surface for engagement with crop stalks being fed from crop passageway 36 under conditions where the butt ends of the stalks are being urged laterally by auger 21 The crop lifter assembly provides a ramp over whicl the stalks of crop material traverse during their move ment toward the discharge outlet. During this time th stalks are fed in a generally horizontal orientatio whereby the ramp lifts and maintains the crop in a pla above the crop material being fed from crop passage way 35. This relative orientation is depicted best i FIG. 3.

Figure 4:
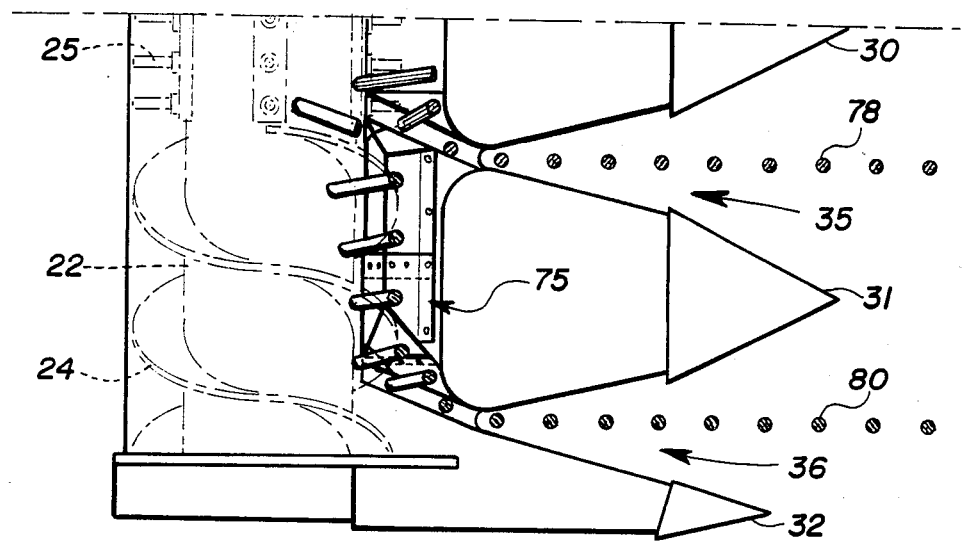
FIG. 4 is a partial plan schematic view of one-half of a four row header attachment showing the unique crop guide of the present invention engaging the cut stalks of row crop material being fed rearwardly via the outer passageway and its continuous path via the auger to the point where it is in the vicinity of crop material being fed rearwardly from the next innermost passageway.

In operation, when the multi-row forage harveste row crop header attachment is being driven across field of standing crop material by power means whicl drives the associated forage harvester, standing rov crop material (illustrated in FIG. 4 by 78 and 80) is firs engaged by crop severing elements and subsequentl gripped by butt end gripping chains and conveyed rear wardly to the position shown in FIGS. 2 and 3 wher the crops are horizontally disposed with the butt ends i engagement with the flighting of auger 21. The row o severed crop designated by 80 in FIG. 4 is guided in wardly along the auger in this horizontal dispositio until it is engaged by feed fingers 25 which in turn urg it rearwardly through discharge outlet 15. Meanwhile the crop material designated by reference numeral 78 i FIG. 4 is severed and guided rearwardly through th crop passageway 35 until it is engaged by the auger in position lower (see FIG. 3) than the plane in which th crop material being guided from crop passageway 36 i disposed. Collisions of crop stalk material is obviated b virtue of the crop lifting assembly which lifts crop 7 and thereby prevents the paths to merge prior to en gagement by the feed fingers of the auger which the smoothly urges the crop material rearwardly througl the discharge outlet without any bunching or unevei feeding. This enhances the overall effectiveness of th row crop header and permits even butt end feeding o crop material to the rotary cutting means of the associ ated forage harvester. A further advantage is provide by assemblies 75 in that feeding by the auger flighting i enhanced and more positive engagement is made possi ble by virtue of the close relationship of surface 77 t the outer periphery of the flighting.

While the preferred structure in which the principle of the present invention have been incorporated i shown and described above, it is to be understood tha the invention is not to be limited to the particular de tails, as shown and described above, but that, in fact widely different means may be employed in the practic of the broader aspects of the invention.

Having thus described the invention, what is claime is:

1. In a multi-row forage harvester row crop heade attachment comprising:
    (a) a supporting frame assembly,
    (b) wall means mounted on said frame assembly an including a wall having a rear outlet therein,
    (c) a plurality of dividers mounted on said fram assembly to extend forwardly for defining at leas two side-by-side crop passageways therebetweer spaced at intervals corresponding generally to th spacing between crop rows,
    (d) crop cutting means adjacent each passageway t sever the stalks of standing crop material unde conditions where the header is being propelle across a field,
    (e) gathering and feeding means disposed in said pas sageways for engaging and feeding severed cro material rearwardly, (f) a transversely extending auger for receiving crop material fed rearwardly via said passageways and conveying it laterally to said outlet, the improvement comprising guide means disposed forwardly of said auger and between the outlets of first and second crop passageways, said first passageway being disposed outwardly from said second passageway with respect to said outlet whereby crop material fed to said auger via said first passageway is conveyed to said oultet in the direction of said second passageway and engages said guide means to prevent collisions between crop material being fed from said second passageway.

2. In a multi-row forage harvester row crop header attachment as set forth in claim 1 wherein said guide means guides the stalks of said crop material being fed from the first passageway into engagement with the auger at a level above the stalks of said crop material being fed from the second passgaeway enabling the auger to laterally convey the stalks from the first and second stalkways at different heights.

3. In a multi-row forage harvester row crop header attachment as set forth in claim 2 wherein said guide means comprises a ramp affixed in the path of the stalks of said crop material being fed from said first passageway.

4. In a multi-row forage harvester row crop header attachment as set forth in claim 3 wherein said ramp includes a first surface disposed at an angle to the path of the stalks of said crop material being fed from said first passageway.

5. In a multi-row forage harvester row crop header attachment as set forth in claim 4 wherein said ramp further includes a second surface inwardly from said first surface and disposed in a direction generally parallel to the axis of said auger.

* * * * *